F. H. ROYCE.
CAM SHAFT DRIVING GEAR OF INTERNAL COMBUSTION ENGINES.
APPLICATION FILED DEC. 27, 1917.
1,277,129.
Patented Aug. 27, 1918.
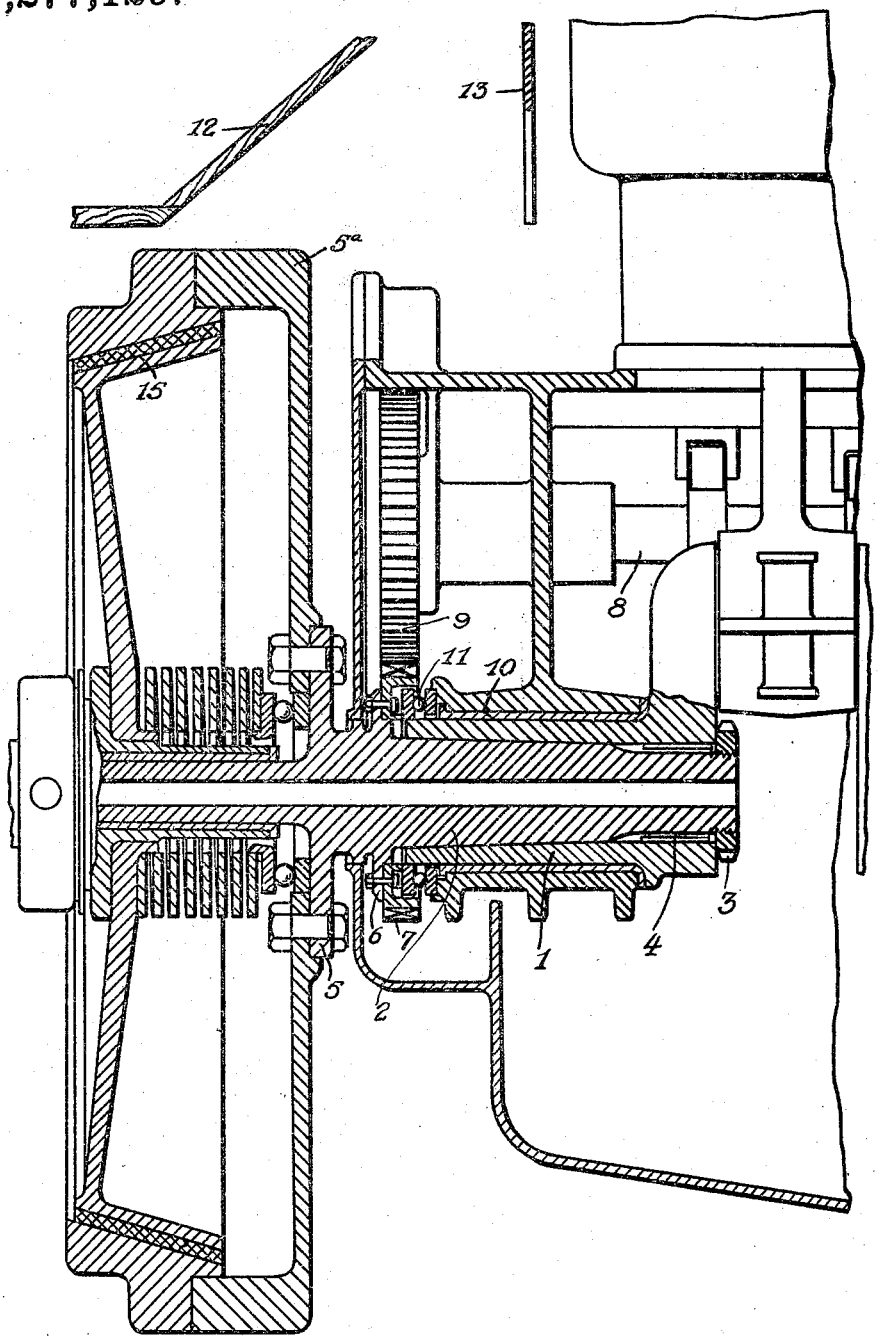
Inventor:
Frederick Henry Royce
by his Attorney

UNITED STATES PATENT OFFICE.

FREDERICK HENRY ROYCE, OF DERBY, ENGLAND, ASSIGNOR TO ROLLS-ROYCE LIMITED, OF DERBY, ENGLAND.

CAM-SHAFT DRIVING-GEAR OF INTERNAL-COMBUSTION ENGINES.

1,277,129.  Specification of Letters Patent.  Patented Aug. 27, 1918.

Application filed December 27, 1917. Serial No. 209,110.

*To all whom it may concern:*

Be it known that I, FREDERICK HENRY ROYCE, of Derby, England, have invented certain new and useful Improvements in Cam-Shaft Driving-Gear of Internal-Combustion Engines, of which the following is a specification.

This invention relates to improved means for driving the camshafts of internal combustion engines from the flywheel end of the crankshaft, and has for its object to provide a more reliable and convenient means than has hitherto been provided.

It has often been found desirable, particularly in motor car practice, to arrange the camshaft drive at the flywheel or rear end of the engine, as by so doing the length of the bonnet can be reduced, and a corresponding amount of additional body room provided. Difficulties, however, in carrying this out have prevented its general use, but in the present invention I have overcome many of these difficulties, and have eliminated the disadvantages which have appeared in other constructions.

In some previous constructions the flywheel has been mounted on a tapered extension of the crankshaft; this method, however, has not proved as satisfactory as the more usual form of fixing in which the flywheel is bolted to a flange.

In the present invention the latter method of mounting the flywheel is retained and at the same time a gear wheel is provided between the end bearing of the crankshaft and the said flange.

The object of the invention is attained by making the engine crankshaft hollow at the rear journal and fitting coaxially therewith a shaft provided with a flange or flanges toward its rear end for the purpose of carrying the flywheel and the timing gear wheel. The rear end of the said shaft may be adapted to carry the driven member of the clutch in the usual manner.

The accompanying drawing, illustrating the application of the invention to an automobile engine, is a part sectional elevation through the rear end crankshaft journal.

The crankshaft 1 has a tapered bore through its rear journal to accommodate a shaft 2, a nut 3 holding the latter shaft securely in position. Serrations provided at 4 prevents any relative rotation of these parts. The shaft 2 is provided with flanges 5 and 6 to which the flywheel 5ª and the timing gear wheel 7 are respectively secured. The said timing gear wheel 7 drives the camshaft 8 through the medium of the gear wheel 9. Between the said wheel 7 and the end journal bearing 10 of the crankshaft, a ball thrust bearing 11 is fitted to take the end thrust on the crank shaft when the clutch 15 is disengaged.

It will be seen that the timing gear can be located beneath the footboards 12, and the dashboard 13 moved a corresponding distance: the distance between the radiator and the dashboard being therefore reduced accordingly.

It should be observed that although the invention has been illustrated in combination with a cone clutch, it is equally applicable in connection with other types of clutch, for example, a plate clutch.

What I claim as my invention and desire to secure by Letters Patent of the United States is:—

1. In a camshaft driving gear for internal combustion engines, the combination of an engine crankshaft bored hollow through its rear journal, a coaxial shaft secured to said crank shaft, and flanges on said coaxial shaft adapted to carry the flywheel and a gear for driving the camshaft.

2. In a camshaft driving gear as set forth in claim 1, the said coaxial shaft being adapted to carry the driven member of the clutch.

In witness whereof I have signed this specification in the presence of two witnesses.

FREDERICK HENRY ROYCE.

Witnesses:
 H. R. CUTTEN,
 F. PARSONS.

Copies of this patent may be obtained for five cents each, by addressing the "Commissioner of Patents, Washington, D. C."